United States Patent [19]

Pastor et al.

[11] Patent Number: 4,752,454
[45] Date of Patent: * Jun. 21, 1988

[54] PROCESS FOR THE PREPARATION OF ULTRAPURE ACTIVE METAL FLUORIDES

[75] Inventors: Ricardo C. Pastor, Manhattan Beach; Luisa E. Gorre, Oxnard, both of Calif.

[73] Assignee: Hughes Aircraft Company, Los Angeles, Calif.

[*] Notice: The portion of the term of this patent subsequent to May 28, 2002 has been disclaimed.

[21] Appl. No.: 686,774

[22] Filed: Dec. 27, 1984

[51] Int. Cl.$^4$ .......................... C01F 9/08; C01G 1/06
[52] U.S. Cl. .................................... 423/19; 423/21.1; 423/76; 423/252; 423/489
[58] Field of Search ................ 423/19, 252, 21.1, 76, 423/487

[56] References Cited

U.S. PATENT DOCUMENTS

| | | | |
|---|---|---|---|
| 2,397,929 | 4/1946 | Dimmick | 423/252 |
| 2,893,825 | 7/1959 | Malm et al. | 423/19 |
| 2,972,513 | 2/1961 | Mogard et al. | 423/252 |
| 2,991,149 | 7/1961 | Flynn | 423/252 |
| 3,353,929 | 11/1967 | Kuacke et al. | 423/19 |
| 3,748,095 | 7/1973 | Henderson et al. | 423/252 |
| 4,013,796 | 3/1977 | Swinehart et al. | 423/489 |
| 4,089,937 | 5/1978 | Swinehart et al. | 423/489 |
| 4,341,873 | 7/1982 | Robinson et al. | 65/30.1 |
| 4,519,986 | 5/1985 | Pastor et al. | 423/19 |

OTHER PUBLICATIONS

Pausewang et al., *Z. Anorg. Allg. Chem.*, 369 (1–2), pp. 89–104, (1969), QD1 74.

Hertmann et al., *Appl. Opt.*, 7 (2), 307–309, (1968), QC 350 AS.

Robinson et al., "Proceedings Electro-Optics/Laser 81 Conf. & Extr.", pp. 191–196, Nov. 1981.

*Primary Examiner*—Edward A. Miller
*Attorney, Agent, or Firm*—Wanda K. Denson-Low; A. W. Karambelas

[57] ABSTRACT

This invention provides a method for the preparation of ultrapure active metal fluorides of increased purity from their metal oxides by reacting an active metal with a predetermined amount of HF(aq) to form a solid reaction product which is dried under controlled heating to form a hydrated fluoride. This hydrated active metal fluoride is then subjected to reactive atmosphere processing comprising hydrofluoric acid vapor in a $CO_2$ reactive carrier gas and a selected fluoride compound in the gas phase for a predetermined period of time to further increase anion purity.

13 Claims, 1 Drawing Sheet

PROCESS FOR THE PREPARATION OF ULTRAPURE ACTIVE METAL FLUORIDES

TECHNICAL FIELD

This invention relates to metal fluorides. More particularly, this invention relates to an improved process for the preparation of active metal fluorides having lower concentration levels of water-derived impurities than those previously known to exist in the art.

BACKGROUND OF THE INVENTION

Materials which are used to form optical components, such as laser windows or optical fibers, must be transparent to the particular wavelength of radiation that they must transmit. The use, particularly of metal halides as windows for high powered lasers at 2-6 micrometers and 10.6 micrometers, requires rigid constraints on anion purity levels. Metal halide crystals grown from state-of-the-art purified starting materials contain trace cation and anion contaminants which, when subject to high energy laser applications, cause undesirable optical absorption and structural failures. Even materials having purities of 99.999% form windows which have an undesirable tendency to absorb energy from the laser beam. This absorption of energy can cause the window to overheat, resulting in fracture and opacity.

Anion purity, therefore, is a primary concern for high-power IR window materials since anions, particularly $OH^-$ and $O^{--}$, contribute significantly to IR absorption. The vibrational modes of anions are infrared active and often involve high absorption cross-sections so that much less than one ppm is needed to achieve an absorption coefficient below 0.001 $cm^{-1}$ in the crystal.

Metal fluorides such as thorium fluoride ($ThF_4$) have recently been found to be useful for, among other things, thin film reflectors and anti-reflectors which are suitable for use in high-power carbon dioxide laser systems. When used as a reflector, thorium fluoride is provided as a thin film on a suitable substrate that is external to the laser resonator cavity. This film can thereby deflect the laser beam in a predetermined direction toward the target. It is desirable to deflect the laser beam efficiently, in order to prevent losses in the laser beam intensity. When used as an anti-reflector, materials such as thorium fluoride may be coated on the surface of a laser window to provide a refractive index at the window surface such that the reflection of the laser beam is minimized while the transmission of the laser beam through the window is maximized. However, in order to be suitable for such purposes, thorium fluoride must have a high transmission and low absorption for the 10.6 micrometer radiation from the carbon dioxide laser so that the film will not heat up enough to cause its own destruction, as discussed previously.

Commercial powders currently available are unsuitable starting materials for the congruent growth of certain metal fluorides, particularly those such as $ThF_4$. The anion purity of these powders may be no better than three-nines complete in the conversion to the fluoride. A few hundred ppm of oxide or hydroxide in rare-earth or alkaline-earth fluoride powders cause difficulties in crystal growth. However, even if the anion purity is satisfactory after conversion, an alternate problem such as the stability of the powder is encountered. In particular, the powder can undergo hydrolysis as a result of the absorbance of moisture from the air.

Several methods are given for the conversion of metal oxides to metal halides. One method which involves treatment with anhydrous HF, a method capable of achieving four nines conversion, encounters two difficulties. First, the large amount of water formed renders HF vapor very corrosive, and therefore there is a tendency for the metal halide to pick up further impurities. The exothermic reaction has a runaway tendency which thwarts further conversion by confining the reaction to the surface, resulting in the formation of a crust.

Another more effective procedure, which combines the wet and dry conversions, is disclosed by R. C. Pastor and R. K. Chew, entitled "Process for the Preparation of Ultrapure Thorium Fluoride", U.S. Pat. No. 4,519,986 filed on Jan. 28, 1982, which is assigned to the present assignee. Thorium oxide is reacted with a predetermined amount of hydrofluoric acid to form a solid reaction product which is then dried under controlled heating to form hydrated thorium fluoride. The hydrated thorium fluoride is then exposed to a reactive atmosphere comprising hydrofluoric acid vapor and a chosen fluoride compound in the gas phase, utilizing an inert helium carrier gas at elevated temperatures. The hydrated thorium fluoride is exposed to this reactive atmosphere for a selected period of time to remove substantially all of the water and water-derived impurities from the hydrated thorium fluoride. This process is particularly useful in the production of heavy metal fluorides in the crystal form.

Metal halides have been purified by numerous other prior art methods. For example, U.S. Pat. No. 3,826,817, assigned to the present assignee, discloses a method for the synthesis of metal halides having extremely low hydroxyl ion contamination levels. These metal halides are synthesized by reacting an alkali salt in the solid state with a gaseous compound that is capable of simultaneously replacing the anion of the salt with a halide and gettering any water that might be produced by the chemical reaction.

U.S. Pat. No. 3,969,491, assigned to the present assignee, discloses a process wherein alkali metal halides in the molten form are scrubbed with gaseous nascent halogen, preferably a halogen corresponding to the halide anion. Once the gaseous nascent halogen has removed the trace impurities of both cations and anions, the purified material can then be utilized to form single crystals.

U.S. Pat. No. 3,932,597, assigned to the present assignee, discloses a process wherein metal halides are scrubbed with a halide-source species in the vapor phase to upgrade their purity. This process is effective in not only reducing the concentration of oxyanion impurities and volatile cation halide impurities, but it is also effective in reducing hydroxyl ion contamination as well.

U.S. Pat. No. 4,190,640 is an improved process for generating nascent bromines through the pyrolytic dissociation of $CBr_4$. This patent provides a reactive gas carrier comprised of a mixture of an inert gas such as nitrogen, argon or helium and nitric or nitrous oxide in the bromide pyrolysis chamber as the bromide is subjected to temperatures in excess of 600° C.

Though numerous attempts have been made to achieve ultrapure metal fluorides, the demands of the art mandate an ever increasing need for the purest material possible.

SUMMARY OF THE INVENTION

In accordance with the invention, a process is provided for the preparation of ultrapure active metal fluorides of improved purity from their metal oxides by reacting an oxide of an active metal with a predetermined amount of aqueous hydrofluoric acid to form a solid reaction product. The reaction product is then dried under controlled heating to form a hydrated fluoride of the chosen active metal having a predetermined amount of hydration. The active metal fluoride is thereafter exposed to a reactive atmosphere comprising hydrofluoric acid vapor in a carbon dioxide reactive carrier gas and a selected halide compound in the gas phase at a predetermined elevated temperature for a predetermined period of time to further upgrade anion purity.

The present invention provides a process for the preparation of ultrapure active metal fluorides having increased anionic purity.

The present invention provides a new and improved process for the preparation of active metal fluorides having minimized water and water-derived impurities.

The present invention provides a new and improved process for producing active metal fluorides having maximized optical transmission at 10.6 micrometers.

The foregoing and other advantages and features of the present invention will be apparent from the following description of the embodiments of the instant invention.

DETAILED DESCRIPTION OF THE INVENTION

Figure 1:
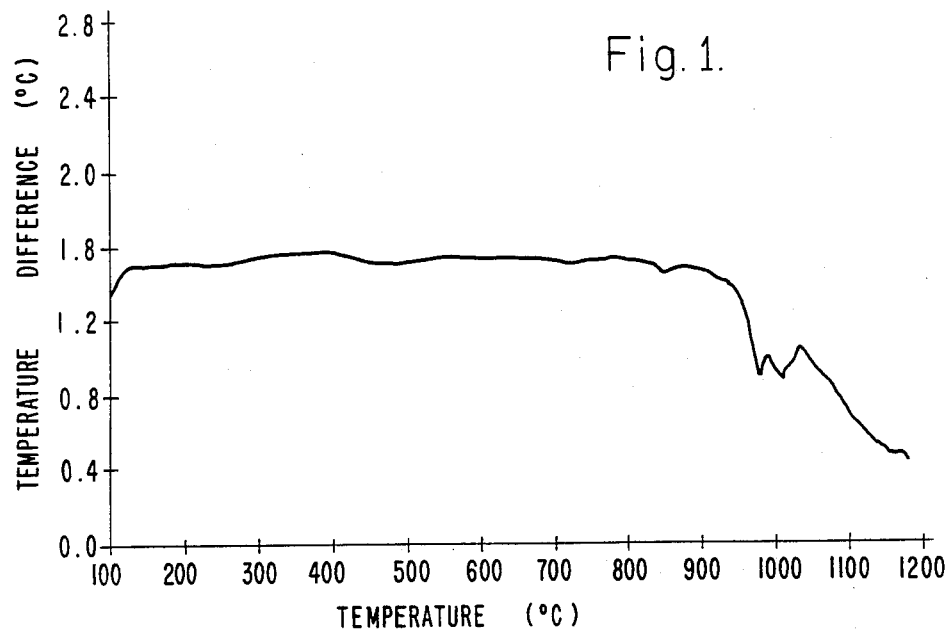
FIG. 1 represents a thermogram of wet converted thorium fluoride powder prepared by a prior art process which was melted under a reactive atmosphere of hydrofluoric acid vapor, tetrafluoromethane gas and an inert helium carrier gas.

A heavy metal fluoride has been generally characterized in the art as a metal fluoride having a high atomic weight. However, we are now aware of two specific subdivisions or subclasses within the broader class of heavy metal fluorides namely, active metal fluorides and heavy metal fluorides wherein its metal component behaves as pseudo-noble metal. The behavior of this type of heavy metal fluoride is discussed in more depth in our U.S. application, Ser. No. 06/343,637, filed concurrently herewith.

Active metal fluorides, as defined in accordance with the present invention are good electron donors when in the neutral form. It should be noted that the donor or acceptor ability is with respect to oxygen. An active metal fluoride as utilized in the present invention can include compounds having an active metal component such as Zr, Hf, Th, Sc, Y, or a rare earth metal.

The process of the present invention for the preparation of ultrapure active metal fluorides comprises first, the reaction of a relatively pure (i.e., 99.9%) active metal oxide, for example thorium oxide, which is commerically available, with a predetermined amount of electronic grade aqueous hydrofluoric acid (HF), which is 49 weight percent HF, at a temperature slightly above room temperature according to the following reaction:

$$ThO_2 + 4HF(aq) \rightarrow ThF_4 \cdot xH_2O + (2-x)H_2O$$

After the above reaction is completed, the excess HF(aq) and water are removed by evaporation at or below approximately 100° C. The residue product is thereafter weighed at periodic intervals until the desired amount of conversion to $ThF_4 \cdot xH_2O$ is attained. The product, $ThF_4 \cdot xH_2O$, in this case is hydrated thorium fluoride with $0.39 \leq x < 1$; with $x = 0.39$ being preferred. This particular hydrate composition is utilized because a hydrated product with minimized water content is produced.

The second step of the process of the present invention involves exposing the hydrated thorium fluoride ($ThF_4 \cdot xH_2O$) to reactive atmosphere processing. The reactant gases utilized in the process of the present invention are carbon dioxide gas ($CO_2$) as the reactive carrier gas; hydrofluoric acid (HF) vapor; and a selected fluoride compound in the gas phase such as carbon tetrachloride ($CCl_4$) and tetrafluoromethane ($CF_4$), other chlorofluoromethane derivatives such as dichlorodifluoromethane ($CCl_2F_2$), etc., or higher halo-carbon derivatives. All of these compounds are commercially available.

The preferred method of the present invention comprises step 1 as enumerated above. The second step comprises subjecting the hydrated product, i.e., hydrated thorium fluoride, to a reactive atmosphere of hydrofluoric acid vapor, tetrafluoromethane gas, carbon tetrachloride gas and carbon dioxide as the reactive carrier gas. More specifically, the hydrated product, i.e., $ThF_4 \cdot xH_2O(c)$ is heated under hydrofluoric acid vapor with carbon dioxide as the reactive carrier gas, and thereafter, at a temperature of at least about 900° C., tetrafluoromethane gas is introduced into the reactive mixture. Approximately 10–30 volume percent of the total gaseous mixture of HF, and $CF_4$ was typically utilized, at a flow rate of approximately 1 cc/sec. The temperature of the reaction mixture is then gradually raised to slightly above 1200° C., at which point the reaction mixture is then gradually cooled. As the reaction mixture is cooled, the tetrafluoromethane gas, ($CF_4$) is replaced at approximately 900° C. by carbon tetrachloride gas. Typically, approximately 10–30 volume percent of the total gaseous mixture of $CCl_4$ would also be utilized at a flow rate of approximately 1 cc/sec. However, it should be noted that the exact flow rate or volume percent of any of the gases would be dependent upon the size of the sample being converted, as well as time contraints. These parameters are not critical and could be easily determined by one of skill in the art.

Another embodiment of the present invention comprises step 1 as previously discussed. The second step, however, utilizes a reactive atmosphere of hydrofluoric acid vapor in a carbon dioxide reactive carrier gas, however, this time utilizing chlorofluoromethane derivatives or other higher halo-carbon derivatives throughout the entire heat up and cool down cycles. Typical compounds of this type would include dichlorodifluoromethane ($CCl_2F_2$), monochlorotrifluoromethane ($CClF_3$), trichloromonofluromethane ($CCl_3F$), and dichlorotetrafluoroethane ($C_2Cl_2F_4$), etc.

Our studies have shown that for active metals, defined in accordance with the present invention, hydrolysis of the condensed phase, hereinafter designated as (c), by the ever-present outgas, H₂O(g), introduces OH⁻, a pseudohalide impurity which is isoelectronic and of the same size as F⁻. The following equation illustrates how the pseudohalide impurity, OH⁻, is produced:

$$F^-(c) + H_2O(g) = OH^-(c) + HF(g) \quad (1)$$

As a result of the continued accumulation of the OH⁻(c) impurity in the condensed phase, O⁻⁻ is also formed. O⁻⁻ is another impurity which is isoelectronic and about the same size as F⁻. Its formation can be illustrated by the following equation:

$$2OH^-(c) = O^{--}(c) + H_2O(g) \quad (2)$$

At increasingly higher temperatures, the forward progress of Equation (2) is supported by Equation (1). More simply, any OH⁻(c) produced by Equation (1) is consequently consumed by Equation (2) as per the following:

$$2F^-(c) + H_2O(g) = O^{--}(c) + 2HF(g) \quad (3)$$

However at high temperatures, depending upon the active metal, the O⁻⁻(c) impurity will predominate over the OH⁻(c). This is explained by the fact that the free energy of formation of 2HF(g) is much lower than that of H₂O(g). As a result, 2HF(g) is formed more easily, thereby causing the forward reaction of Equation (3) to predominate. To counteract the forward progress of Equation (3), therefore, a metal fluoride with a low free energy of formation is needed so that the value of 2F⁻(c) of the metal fluoride is lower than for O⁻⁻(c) of the metal oxide. This will more than offset the difference in free energy of formation values between 2HF(g) and H₂O(g).

In the case of active-metal fluorides, such as thorium fluoride, only the OH⁻ impurity can be vapor transported. The oxide impurity, O⁻⁻, is involatile. As a result, an active metal fluoride film contaminated by an O⁻⁻ impurity is still far superior to a metal fluoride film contaminated by an OH⁻ impurity. Therefore, if the evaporation temperature of the former material is sufficiently high, the action of the low background H₂O(g) is limited to the occurrence at the surface of the involatile O⁻⁻ impurity by Equation (3). Hence, the O⁻⁻ contaminant is concentrated in the source and not in the evaporative film deposit.

In our U.S. Ser. No. 343,637, we taught the preparation of ultrapure heavy metal fluorides by reacting thorium oxide with a predetermined amount of HF to form a solid reaction product. The hydrated thorium fluoride is subsequently exposed to a reactive atmosphere of HF in an inert helium carrier gas and a chosen fluoride compound. not including carbon tetrachloride, chloride, in the gas phase. However, in U.S. Ser. No. 343,637, the helium gas functioned merely as an inert carrier gas that did not aid in the liberation of water impurities. In the instant invention, however, the carbon dioxide reactive carrier gas is a reactant that does aid in the liberation of water impurities. We believe that after a certain point, the effectiveness of hydrofluoric acid (HF) vapor as an aid in the conversion of metal oxide to fluoride, as previously utilized in our U.S. Ser. No. 343,637, begins to decline.

Apparently, the conversion of thorium oxide proceeds to some low value of "α" at a high operating temperature, as follows:

$$ThO_2(c) + 4(1-\alpha)HF(g) = ThF_{4(1-\alpha)}O_{2\alpha}(c) + 2(1-\alpha)H_2O(g). \quad (4)$$

However, when the product of Equation (4) is cooled, an addition reaction occurs which shows the close analogy in behavior between H—OH and H—F, as illustrated by the following equations:

$$ThF_{4(1-\alpha)}O_{2\alpha}(c) + 2\alpha H_2O(g) = ThF_{4(1-\alpha)}(OH)_{4\alpha}(c), \quad (5)$$

$$ThF_{4(1-\alpha)}O_{2\alpha}(c) + 2\alpha HF(g) = ThF_{4(1-\frac{\alpha}{2})}(OH)_{2\alpha}(c). \quad (6)$$

As detailed earlier, this shift in composition from ThF₄₍₁₋α₎O₂α(c), the product of Equation (4), to the OH-containing products of Equations (5) and (6), consequently, results in a degradation in the optical transparency of the resulting film. This occurs since in the case of active-metal fluorides, as previously discussed, the OH⁻ impurity is vapor transported and is consequently concentrated in the evaporated film deposit.

As a result, CCl₄ and CF₄ in conjunction with CO₂ are utilized in accordance with the preferred embodiment of the present invention to alleviate the sources of water contamination in the active metal fluoride products which occur not only as a result of the normal chemical synthesis, but additionally as a result of the outgassing of water vapor from the walls of the reaction apparatus at elevated temperatures.

Typically, active metal fluorides require significantly higher operating temperatures (greater than 900° C.) than heavy metal fluorides which behave as pseudonoble metals. Herein lies the need for a two-fold reactive atmosphere processing step when the preferred embodiment of the present invention is employed. CCl₄ is reactive at temperatures both above and below 900° C. However, at temperatures above 900° C., its chlorine atoms may, indirectly via substitution, replace fluorine atoms in the metal fluoride product with the OH⁻ impurity. CF₄, however, is reactive at temperatures above 900° C. and although inactive at temperatures below 900° C. it will not interfere with the metal fluoride product. In the case of chlorofluoromethane derivatives or other higher carbon derivatives, these gases are reactive at temperature both above and below 900° C.

At temperatures above 900° C., the CF₄ reactive atmosphere removes outgassed water vapor to prevent the contamination of the active metal fluoride product as illustrated below:

$$CF_4(g) + H_2O(g) \rightarrow 2HF(g) + COF_2(g) \quad (7)$$

$$COF_2(g) + H_2O(g) \rightarrow 2HF(g) + CO_2(g) \quad (8)$$

Equation (7) is favored in the forward direction which produces a powerful getter for outgas H₂O(g) as illustrated by Equation (8) above.

At temperatures below 900° C., carbon tetrachloride gas and the carbon dioxide reactive carrier gas react as a powerful getter for H₂O(g) as follows:

$$CO_2(g) + CCl_4(g) \rightarrow 2COCl_2(g) \quad (9)$$

$$COCl_2(g) + H_2O(g) \rightarrow CO_2(g) + 2HCl(g) \qquad (10)$$

Equation (9) is favored in the forward direction, which produces a powerful getter for outgas $H_2O(g)$ as illustrated by Equation (10) above. Equations (9–10) all occur in the gas phase before any interaction has taken place with a metal oxide.

Molecular $Cl_2$ and atomic $Cl$, the dissociation products of $CCl_4$, also attack $H_2O(g)$ to form $HCl(g)$, thereby liberating $O_2(g)$. The $Cl^-(c)$ impurity, shown below, is introduced by the displacement action of $Cl(g)$ and $Cl_2(g)$ on the anion impurities $OH^-(c)$ and $O^{--}(c)$:

$$Cl(g) + OH^-(c) \rightarrow Cl^-(c) + OH(g) \qquad (11)$$

$$Cl_2(g) + O^{--}(c) \rightarrow 2Cl^-(c) + O(g) \qquad (12)$$

In accordance with another embodiment of the instant invention, the chlorofluoromethane derivatives or other higher halo-carbon derivatives, for example, dichlorodifluoromethane ($CCl_2F_2$) can be utilized at temperatures both above and below 900° C. as previously discussed as follows:

$$CO_2 + CCl_2F_2 \rightarrow COCl_2 + COF_2 \qquad (13)$$

The carbonyl chloride and carbonyl fluoride which is thereupon produced can further act as powerful getters for outgassed $H_2O(g)$ as illustrated below:

$$COCl_2(g) + H_2O(g) \rightarrow CO_2(g) + 2HCl(g) \qquad (14)$$

$$COF_2(g) + H_2O(g) \rightarrow CO_2(g) + 2HF(g) \qquad (15)$$

Equations (14) and (15) correspond respectively, to Equations (10) and (8) previously shown. Equations (13–15) all occur in the gas phase before any interaction has taken place with any hydrated metal fluoride. It is important to remember that reactions with active metals take place at comparatively higher operating temperatures than reactions with heavy metals which behave as pseudo-noble metals. Since these operating temperatures are different, the rates of attack (or cleanup) for the various reactants are also different. Reactions with active metals as a result of these higher operating temperatures take place much more rapidly. This time element is a significant feature for large scale manufacturing.

Active metal fluorides cannot be reduced by carbon. As a result, during reactive processing of active metal fluorides, a high-density graphite crucible can be used instead of an alumina crucible having the more expensive platinum liner.

The ultrapure active metal fluorides prepared in accordance with the process of the present invention are particularly useful for the deposition of thin films or dielectric coatings for optical components. The ultrapure active metal fluorides formed in accordance with the present invention have demonstrated low optical absorption at approximately 3.8 micrometers and maximum optical transmission at 10.6 micrometers.

EXAMPLE I

This example illustrates in detail the preparation of an active metal fluoride, for example, thorium fluoride, utilizing the preferred process of the present invention.

A 577.03 gm sample of 99.9% pure thorium oxide ($ThO_2$), obtained from Cerac Inc., of Milwaukee, Wis., was placed in a one-liter polytetrafluoroethylene beaker. Approximately 400 milliliters of deionized water was added and the mixture was thereafter stirred. The beaker was then placed for approximately thirty minutes in a boiling water bath. Electronic grade aqueous HF (49 percent by weight HF), was thereafter added to the beaker in 30 ml portions. The additions of aqueous HF were made at intermittent intervals which permitted the highly exothermic reaction which occurred as a result of the addition of aqueous HF to subside before the next addition was made. The total amount of aqueous HF used was approximately two to three times the theoretical stoichiometric amount needed for complete conversion. Upon completion of the above reaction and after all HF(aq) additions had been made, the excess water and HF(aq) were evaporated to form a residue utilizing a water bath. The beaker containing the residue was weighed periodically in order to ascertain when the desired conversion point was reached. When the weight ratio of the residue to the starting material was approximately 20% higher after drying, conversion (to hydrated thorium fluoride) was considered to be complete.

Step 1 of the process of the instant invention as illustrated in this example took approximately 2 days to complete. Of course, this time factor will vary depending upon the size of the sample to be processed. The hydrated thorium fluoride, $ThF_4 \cdot xH_2O$, with $x = 0.39$, in this particular example, was then processed utilizing a reactive atmosphere as described below.

Utilizing the basic apparatus as illustrated in our U.S. application Ser. No. 343,637, which issued as U.S. Pat. No. 4,519,986 May 28, 1985, with only minor modifications (not shown), two alumina boats having Pt foil linings and each containing a sample of the hydrated thorium fluoride weighing between 50-60 gms, prepared as described above, were placed in an alumina reaction tube. The alumina reaction tube was capped and placed in a tubular silicon carbide furnace obtained from Lindbergh, Division of Sola Basic Industries of Watertown, Wis. The reaction tube was flushed with $CO_2$ gas and then HF gas at 10–30 volume percent of the total gaseous mixture was introduced at a flow rate of approximately 1 cc/sec. Approximately 4–5 gms of HF gas was consumed per run. The furnace was heated up under HF(g) and $CO_2(g)$ as the reactive carrier gas. At approximately 900° C., tetrafluoromethane gas ($CF_4$) at 10–30 volume percent was introduced into the mixture. The temperature was gradually raised until it reached approximately 1200° C. After approximately fifteen to twenty minutes at about 1200° C., the furnace was gradually cooled. As the temperature within the furnace reached, once again, approximately 900° C., the tetrafluoromethane gas flow was terminated and thereafter replaced by carbon tetrachloride gas at approximately 10–30 volume percent and at a flow rate of approximately 1 cc/sec. The hydrofluoric acid gas was thereafter terminated. The furnace containing the reaction mixture was subsequently cooled for the remainder of the period under carbon tetrachloride gas and carbon dioxide gas as the reactive atmosphere carrier gas. When the furnace was sufficiently cooled, the liquid source of carbon tetrachloride gas was bypassed and the system was flushed with carbon dioxide gas before the apparatus was opened. The complete cycle for the second step of reactive atmosphere processing for this example took approximately 2 hours time to complete. It should be noted that the time needed for processing would vary depending upon the size of the sample. The reaction tube was then opened and the product was collected from the alumina boat and weighed. The volatilization loss by the above-described process was only approximately 1%.

EXAMPLE II

The melting curves of metal fluorides become ill-defined as they become contaminated with anion impurities as illustrated in FIG. 5 and FIG. 6 of an article entitled "Congruent Melting and Crystal Growth of LiRF$_4$" by R. C. Pastor and M. Robinson, et al in *Materials Research Bulletin*, Vol. 10, pp. 501–510, 1975. Consequently, this example compares the melting curves (as shown by thermogram analysis) of an active metal fluoride, thorium fluoride, prepared according to a prior art process, that of our previously filed U.S. application, Ser. No. 343,637 (See FIG. 1), with an active metal fluoride prepared according to the process of the instant invention (See FIG. 2). U.S. application Ser. No. 343,637, was previously thought to be the best process for the preparation of ultrapure metal halides.

Figure 2:
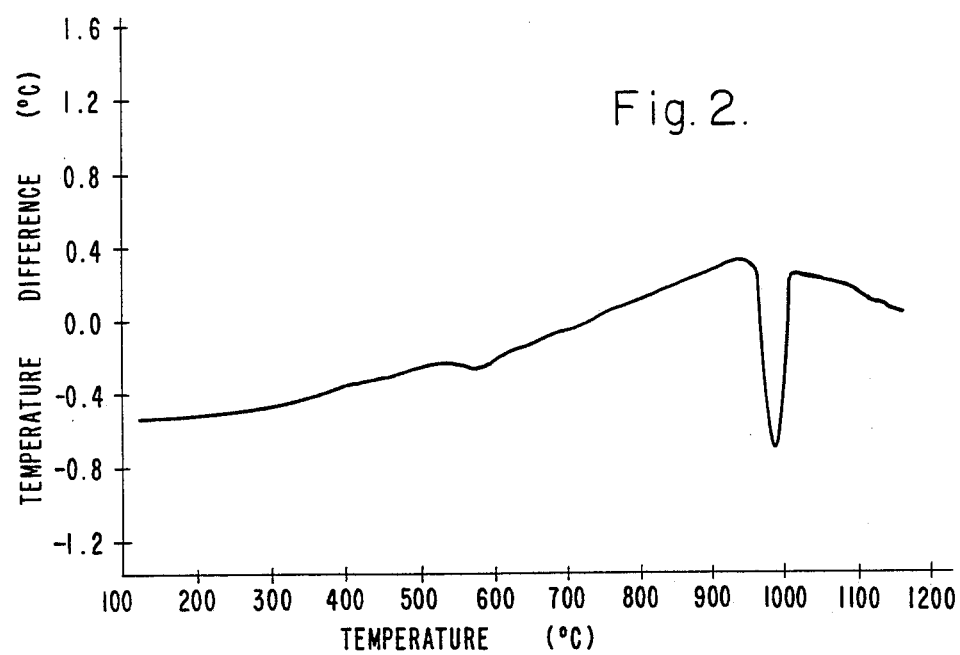
FIG. 2 represents a second thermogram of wet converted thorium fluoride powder melted under a reactive atmosphere of hydrofluoric acid vapor, tetrafluoromethane gas and a reactive carbon dioxide carrier gas.

The thermograms of FIGS. 1 and 2 were prepared utilizing a Dupont 1090 Thermal Analyzer (DTA). The improvement brought about by the processing method of the instant invention, over that of the previous method depicted in U.S. application, Ser. No. 343,647, is very evident from a comparison of these thermograms. FIG. 1 shows poorly defined melting at approximately 1000° C. in the thorium fluoride product (ThF$_4$) that was produced by the HF—CF$_4$—He process of U.S. Ser. No. 343,647. FIG. 2, which is illustrative of the instant invention, shows significantly better defined melting behavior in the thorium fluoride product produced by the HF—CF$_4$—CO$_2$ process.

Since it is clear that well-defined melting behavior is a means of measuring anion purity, it is evident that the thorium fluoride prepared according to the process of the instant invention is significantly more pure.

What is claimed is:

1. A process for the preparation of an ultrapure active metal fluoride of improved purity wherein the active metal is selected from the group consisting of Zr, Hf, Th, Sc, Y and rare earth metals, from its active oxide comprising the steps of:
   (a) reacting the oxide of said active metal with a predetermined amount of aqueous hydrofluoric acid to form a solid reaction product;
   (b) drying said solid reaction product under controlled heating to form a hydrated fluoride of said chosen active metal having a predetermined amount of hydration; and
   (c) exposing said hydrated active metal fluoride to a reactive atmosphere of hydrofluoric acid vapor in a carbon dioxide reactive carrier gas, and a selected halogen containing compound in the gas phase at a predetermined elevated temperature for a predetermined period of time to thereby further increase anion purity.

2. The process as set forth in claim 1 wherein said selected halogen containing compound in the gas phase is chosen from the group consisting of gaseous halo-carbons.

3. The process of claim 1 wherein exposing said hydrated active metal fluoride to a reactive atmosphere further comprises:
   (a) exposing said hydrated active metal fluoride to a reactive atmosphere of hydrofluoric acid in a carbon dioxide reactive carrier gas while simultaneously raising the temperature of said reaction mixture to approximately 900° C.;
   (b) introducing at approximately 900° C. tetrafluoromethane gas into said reaction mixture while continuing to raise the temperature of said reaction mixture to approximately 1200° C.; and
   (c) gradually cooling the reaction mixture to approximately 900° C. whereupon the flow of tetrafluoromethane gas is terminated, and carbon tetrachloride ga is introduced into the reaction mixture.

4. The process of claim 1 wherein exposing said hydrated active metal fluoride to a reactive atmosphere further comprises:
   (a) exposing said hydrated active metal fluoride to a reactive atmosphere of hydrofluoric acid vapor in a reactive carbon dioxide carrier gas while simultaneously raising the temperature of said reaction mixture up to approximately 900° C.;
   (b) introducing at approximately 900° C. a chlorofluoromethane derivative gas or other gaseous halocarbon gas into said reaction mixture while raising the temperature of said mixture to approximately 1200° C.; and
   (c) gradually reducing the temperature of said reaction mixture.

5. The process of claim 1, 2, 3 or 4 wherein the active metal is thorium.

6. The process of claim 4 wherein the gaseous halocarbon is dichlorodifluoromethane.

7. The process of claim 4 wherein the gaseous halocarbon is trichloromonofluoromethane.

8. The process of claim 4 wherein the gaseous halocarbon is monochlorotrifluoromethane.

9. A process for the preparation of an ultrapure thorium fluoride of improved purity from its thorium oxide comprising the steps of:
   (a) reacting thorium oxide with 2–3 times the theoretical stoichiometric amount of aqueous hydrofluoric acid to form a solid reaction product;
   (b) drying said solid reaction product under controlled heating to form hydrated thorium fluoride, ThF$_4 \cdot x$H$_2$O with x=0.39;
   (c) exposing said hydrated thorium fluoride to a reactive atmosphere of 10–30 volume percent of hydrofluoric acid vapor at a flow rate of 1 cc/sec in a carbon dioxide reactive carrier gas while simultaneously raising the temperature of said reaction mixture to 900° C. for a predetermined time;
   (d) introducing at approximately 900° C. 10–30 volume percent of tetrafluoromethane gas at a flow rate of 1 cc/sec into said reaction mixture while simultaneously raising the temperature of said reaction mixture to 1200° C.;
   (e) gradually cooling the reaction mixture to approximately 900° C. whereupon the flow of tetrafluoromethane gas is terminated, and 10–30 volume percent of carbon tetrachloride gas at a flow rate of 1 cc/sec is introduced into the reaction mixture; and
   (f) continuing to gradually cool the reaction mixture until the reaction is complete whereby the thorium fluoride product will have its anion purity greatly increased.

10. The process of claim 4 wherein the gaseous halocarbon is dichlorotetrafluoroethane.

11. The process as set forth in claim 1 wherein said selected halogen containing compound in the gas phase is tetrafluoromethane.

12. The process as set forth in claim 1 wherein said selected halogen containing compound in the gas phase is carbon tetrachloride.

13. The process as set forth in claim 1 wherein said selected halogen containing compound in the gas phase is a gaseous chlorofluorocarbon.

* * * * *